United States Patent
Pusch et al.

(10) Patent No.: US 6,206,102 B1
(45) Date of Patent: Mar. 27, 2001

(54) METHOD FOR STABILIZING THE GAS FLOW IN WATER-BEARING NATURAL GAS DEPOSITS OR RESERVOIRS

(75) Inventors: Gunter Pusch, Celle; Rudiger Meyn, Clausthal-Zellerfeld; Willibald Burger; Michael Geck, both of Burghausen, all of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/319,288

(22) PCT Filed: Dec. 18, 1997

(86) PCT No.: PCT/EP97/07112

§ 371 Date: Jun. 2, 1999

§ 102(e) Date: Jun. 2, 1999

(87) PCT Pub. No.: WO98/27315

PCT Pub. Date: Jun. 25, 1998

(30) Foreign Application Priority Data

Dec. 19, 1996 (DE) ............................ 196 53 136

(51) Int. Cl.$^7$ .................................... E21B 43/16
(52) U.S. Cl. ....................... 166/305.1; 166/295
(58) Field of Search .................. 166/294, 295, 166/305.1

(56) References Cited

U.S. PATENT DOCUMENTS 4,095,651    6/1978  Chauveteau et al. .
5,346,013    9/1994  Pusch et al. .
5,985,994 *  11/1999 Oberneder et al. ............ 524/864

FOREIGN PATENT DOCUMENTS 0 707 134    4/1996  (EP) .
96/37556 *   11/1996 (WO) .

OTHER PUBLICATIONS

Derwent Abstract corr. to EP 0707134 (AN 96–180492) Apr. 17, 1996.
Derwent Abstract of SU 1315602 (AN 88–027029) 1988.
Derwent Abstact of SU 1838587 (AN 95–153502) 1995.
Derwent Abstract AN 92–165090 1992.
Derwent Abstract AN 93–091996 1993.
Derwent Abstract AN 84–028279 1984.
Derwent Abstract AN 81–45427D 1981.
Ullmanns Encyclopedia of Industrial Chemistry, Verlag Chemie Weinheim, 4$^{th}$ Ed., 1975, vol. 10, pp. 449–473.

* cited by examiner

Primary Examiner—David Bagnell
Assistant Examiner—Jennifer R. Dougherty
(74) Attorney, Agent, or Firm—Brooks & Kushman P.C.

(57) ABSTRACT

The invention relates to a method for stabilizing the gas flow in water-bearing natural gas deposits or reservoirs which produce at least 50 l of water per 1000 m$^3$ (Vn) of extracted natural gas. According to the method, a dispersion comprising the following components is injected into the water-bearing rock: A) an organosilicon compound as the dispersed phase; B) a hydrophilic dispersion agent, which can be mixed with water, and, if needed, C) a dispersing additive.

20 Claims, No Drawings

METHOD FOR STABILIZING THE GAS FLOW IN WATER-BEARING NATURAL GAS DEPOSITS OR RESERVOIRS

FIELD OF THE INVENTION

The invention relates to a process for overcoming effects which hinder the continuous gas flow to a water-bearing natural gas production well or natural gas storage well.

DESCRIPTION OF THE RELATED ART

Natural gas fields and natural gas reservoirs are to be encountered in natural underground cavities of the rock and natural gas reservoirs are also to be encountered in artificial cavities. Said rocks are, by their origin, either sedimentary rocks or evaporites. These rocks are never dry, but are generally associated with stratum waters, possibly even with extended aquifers. Water in the form of saline solutions therefore occurs not only on sinking a well, but on cementing the casing and in the production phase of oil and gas fields. The isolation of water-bearing zones during drilling and cementing and blocking the water ingress in production wells is necessary for economic reasons in order to enable the technical implementation of drilling projects and to avoid or decrease the removal of extracted water which is associated with high costs.

Gas fields or gas reservoirs in which the stratum pressure has already sunk markedly below the hydrostatic pressure constitute a special case. Stratum water can only penetrate into a well if the water saturation in the vicinity of the well is high enough to ensure a continuous flow and the water phase has sufficient expansion energy and/or is entrained by the gas. Owing to the higher water saturation in the pore cavity, the pressure losses increase during flow of the gas phase and the flow pressure on the well bottom decreases, with the water column being able to grow in the well. If the well flow pressure is no longer sufficient, a phase of discontinuous gas production with decreased flow rates occurs.

In the various process variants for sealing off water ingress into wells and during cementation, generally, plugging substances are used, such as cements, swellable clays, epoxide resins having fiber additives, in particular in the case of fissured rocks, gels, suspensions with additives and finely divided silicon dioxide. Reducing the water ingress into production wells can be effected by two methods, that is selective blocking and plugging.

To plug water ingresses, these must be delimitable, so that the remaining productive zones of the rock do not also suffer. Gels of polymeric solutions of polyacrylamide, copolymers and biopolymers can exert a plugging action, but silica gels are also mentioned in some applications. The polymer solution is gelled by admixing or after-flooding with crosslinking substances. Another possibility for exerting a plugging action is precipitations of inorganic salts or organic polymers from aqueous or non-aqueous solvents.

For the selective blocking of the water ingresses over the entire thickness of the hydrocarbon-bearing strata, no precautions need to be taken to select the points of water ingress. Selective blocking is achieved by two process variants, namely by adsorption of hydrophilic polymers or by making the rock surfaces hydrophobic.

The hydrophilic absorption strata increase the flow resistance for the water which continues to flow, which flow resistance is frequently increased by swelling of the absorption stratum. In contrast, for the hydrocarbon phase there is no significant decrease in the permeability. When the rock is made hydrophobic, the interfacial tension has a partially blocking action for the incoming water in the form of the capillary counter pressure.

For the selective blocking, high-molecular-weight polymers based on polyacrylamide (also in cationic form), copolymers, terpolymers and biopolymers are generally used. For making the rock surfaces hydrophobic, silanes, inter alia, have also been tested.

For example, in the Derwent Abstract of SU 1315602, the use of a mixture of tetrabutoxytitanium with a relatively small content of tetrabutoxysilane or tetraethoxysilane for plugging wells against water influx is described. Since these active compounds have low flash points, complex safety precautions are necessary. In the Derwent Abstract of SU 1838587, the use of ethyl silicates for sealing oil wells and gas wells against permeating water is described. In both cases, the gas permeability is also greatly reduced.

The flow resistance must be sufficient to hinder the water at the entrance to the production well. However, the flow resistance cannot be increased as desired, since the liquids injected for blocking must be distributed in the rock to develop their blocking action and the gas must subsequently flush clear its flow paths by displacing the excess unabsorbed treatment liquid. In particular, when the rock permeability is low, the flow resistance cannot be too high, because otherwise the treatment liquid is not injectable and the gas is not able to penetrate the treatment ring.

SUMMARY OF THE INVENTION

The object was therefore to provide a composition which adsorbs to rock surfaces, is readily distributed even in rocks of low permeability, builds up a long-lasting flow resistance for water, but does not hinder the entry of gas by discharging the residual treatment liquid and in the most favorable case even decreases the frictional resistance for gas, so that long-lasting stable gas production is the consequence. These and other objects are achieved by injecting into the water bearing rock a dispersion containing an organosilicon compound as the disperse fraction in a hydrophilic, water-miscible dispersion medium.

The invention relates to a process for stabilizing the gas flow in water-bearing natural gas wells and gas storage wells which deliver at least 50 l of water per 1000 $m^3$ (S.T.P.) of natural gas produced, in which a dispersion comprising the components A) an organosilicon compound as disperse fraction,
B) hydrophilic water-miscible dispersion medium and, if appropriate,
C) a dispersant, is injected into the water-bearing rock.

Preferably, the dispersion is injected by means of a well into the water-bearing rock. In this case organosilicon compound (A) adsorbs to the rock surface. Excess dispersion is preferably distributed in the vicinity of the well by subsequently forcing in gas. The gas used for this purpose can be, for example, air, nitrogen or, preferably, natural gas.

The dispersion is readily distributed in the rock of the natural-gas-containing fields and is chemically inert to the rocks present in the gas fields, the natural gas and the production equipment.

Owing to the selective absorption of organosilicon compound (A) and, if appropriate, dispersant (C) to the rock surfaces, the dispersion introduced into the pore cavity changes. The flow resistance in the rock for water is greatly increased, and that for gas is reduced. The water ingress is therefore reduced and natural gas can flow better. Natural gas scarcely dissolves in organosilicon compound (A) and, if appropriate, dispersant (C) and can, if no excess dispersion blocks the flow paths, flow substantially unhindered to the production well. Owing to the surface-smoothing action of the adsorption stratum, the frictional pressures for injected and produced gas are decreased. This causes an increased production rate for natural gas at the well.

Since the excess dispersion, or its decomposition products, are displaced by gas into the surroundings of the well, no problems occur during production from the well owing to high water saturation in the rock of the surroundings.

In particular, the organosilicon compound (A) is thermally stable at temperatures of 70° C. and significantly above which frequently prevail in gas fields. The flow resistance for water in the rock remains high and the water seal is retained for a long period.

If water flows at high velocity in the rock of the gas fields, the natural gas produced contains at least 50 l of water per 1000 m³ of natural gas produced. The process is particularly suitable for natural gas wells and gas storage wells which deliver at least 100 l of water, in particular at least 500 l of water, per 1000 m³ of natural gas produced.

Preferably, the organosilicon compound is an organopolysiloxane. The organopolysiloxane (A) is preferably made up of units of the general formulae (I) to (VII)

| | |
|---|---|
| $R_3SiO_{1/2}$ | (I), |
| $R_2SiO$ | (II), |
| $RSiO_{3/2}$ | (III), |
| $SiO_{4/2}$ | (IV), |
| $R_2(R'O)SiO_{1/2}$ | (V), |
| $R(R'O)SiO$ | (VI), |
| $R'OSiO_{3/2}$ | (VII), | where

R denotes monovalent hydrocarbon radicals having 1 to 18 carbon atoms, which are optionally substituted by halogen atoms, cyano, amino, alkylamino, quaternary ammonium, mercapto, epoxy, anhydrido, carboxylato, sulfonato, sulfato, phosphonato, isocyanato or polyoxyalkylene groups, R' denotes monovalent hydrocarbon radicals having 1 to 30 carbon atoms and hydrogen atoms, which are optionally substituted by halogen atoms, cyano, amino, alkylamino, quaternary ammonium, mercapto, epoxy, anhydrido, carboxylato, sulfonato, sulfato, phosphonato, isocyanato or polyoxyalkylene groups.

Examples of hydrocarbon radicals R and R' are alkyl radicals, such as methyl, ethyl, n-propyl, isopropyl, n-butyl, isobutyl, tert-butyl, n-pentyl, isopentyl, neopentyl and tert-pentyl; hexyl radicals, such as n-hexyl; heptyl radicals, such as n-heptyl;

octyl radicals, such as n-octyl and isooctyl radicals, such as 2,2,4-trimethylpentyl; nonyl radicals, such as n-nonyl; decyl radicals, such as n-decyl; dodecyl radicals, such as n-dodecyl; octadecyl radicals, such as n-octadecyl; alkenyl radicals, such as vinyl, allyl and 5-hexene-1-yl; cycloalkyl radicals, such as cyclopentyl, cyclohexyl, cycloheptyl and methylcyclohexyl; aryl radicals, such as phenyl, naphthyl, anthryl and phenanthryl; alkaryl radicals, such as o-, m-, p-tolyl, xylyl and ethylphenyl; aralkyl radicals, such as benzyl and alpha- and β-phenylethyl.

Examples of substituted radicals R and R' are cyanoalkyl radicals, such as β-cyanoethyl [sic], and hydrocarbon radicals which have been halogenated by fluorine, chlorine or bromine atoms, for example halo-alkyl radicals, such as 3,3,3-trifluoro-n-propyl, 2,2,2,2',2',2'-hexafluoroisopropyl, 8 heptafluoroiso-propyl, and haloaryl radicals, such as o-, m- and p-chlorophenyl.

Preferably, at least 90 mol % of the radicals R are methyl, ethyl or phenyl, in particular methyl.

Examples of polyoxyalkylene-substituted radicals R and R' are the radicals of the general formula (VIII)

$$-R^1-[O(CR^2{}_2)_c]_dOR^3 \qquad (VIII)$$

where $R^1$ denotes a divalent $C_1$- to $C_6$-alkylene radical, $R^2$ denotes hydrogen atoms, or monovalent $C_1$- to $C_6$-hydrocarbon radicals, $R^2$ denotes hydrogen atoms, or monovalent $C_1$- to $C_6$-hydrocarbon radicals, $R^3$ denotes hydrogen atoms, monovalent $C_1$- to $C_6$-hydrocarbon radicals, $C_1$–$C_8$-acyl radicals, ethyl ether radicals or silyl radicals, c denotes hydrogen atoms, monovalent $C_1$- to $C_6$-hydrocarbon radicals, $C_1$–$C_8$-acyl radicals, ethyl ether radicals or silyl radicals, c denotes values 0, 1, 2, 3, 4 or 5, preferably 2 or 3 and d denotes integers from 1 to 100, preferably 1 to 10.

Examples of the divalent radicals $R^1$ are saturated linear- or branched-chain or cyclic alkylene radicals, such as methylene and ethylene and propylene, butylene, pentylene, hexylene, 2-methylpropylene, cyclohexylene, or unsaturated alkylene radicals such as propenylene and hexenylene.

Examples of the monovalent radicals $R^2$ and $R^3$ are listed under the above examples for R and R'. Examples of acyl radicals are acetyl, of ethyl ether radicals tetrahydropyranyl, and of silyl radicals, trimethylsilyl.

Further examples of polyoxyalkylene-substituted radicals R and R' are the radicals of the general formula (IX)

$$-C-[O(CR^2{}_2)_c]_dOR^2 \qquad (IX),$$

$$HC-[O(CR^2{}_2)_c]_dOR^2$$

where $R^2$, c and d have the meanings given above for the general formula (VIII).

Preferably, at most 20 mol % of the units of the organopolysiloxane (A) have the general formulae (V) to (VII).

Preferably, the organopolysiloxane (A) contains at least 50% by weight, in particular at least 80% by weight, of organopolysiloxanes (A1), which consist of at least 90 mol %, in particular 95 mol %, of units of the general formula (II). In particular, reference is given to the organopolysiloxane (A1) having an average viscosity of 5 to 2,000,000 mPa·s, in particular 350 to 60,000 mPa·s at 25° C.

Preferably, the organopolysiloxane (A) contains at least 2% by weight, in particular at least 5% by weight, and preferably at most 70% by weight, of organopolysiloxane resins (A2) which consist of at least 90 mol %, in particular 95 mol %, of units of the general formulae (I), (IV) and (V). The organopolysiloxane resins (A2) can, for example, be solid at room temperature and exhibit 0.25 [sic] to 1.25 units of the general formula (I) per unit of the general formula (IV). These preferred organo-polysiloxane resins (A2) can contain up to a total of 5% by weight of Si-bonded alkoxy radicals or hydroxyl groups resulting from their preparation. The organopolysiloxane resins (A2) are generally not completely miscible with polydimethylsiloxanes.

Although not cited in the general formulae (I) to (III), some of the radicals R can be replaced by hydrogen atoms directly bonded to silicon atoms. However, this is not preferred.

However, crosslinking organopolysiloxanes are also suitable. Thus, for example, aqueous silicone dispersions which produce an elastomer after removal of the water can also be used.

Preferably, the organosilicon compound is also an organosilane. The organosilane (A) preferably has the above radicals R and OR'. Preferably, at least one radical R is present in the organosilane (A).

Preferably, the organosilane (A) has 1 or 2 radicals R and 2 or 3 radicals OR'. Preferably, the radicals OR' are $C_1$–$C_6$-alkoxy radicals, in particular $C_2$- or $C_3$-alkoxy radicals. Preferably, the radicals R are unsubstituted or amino- or alkylamino-substituted $C_1$–$C_{12}$-alkyl radicals.

However, organosilicon compounds which spontaneously form a dispersion in the dispersion medium (B) without dispersants (C), so-called self-dispersing organosilicon compounds, in particular organopolysiloxanes, are also suitable.

Preferably, at least 10 parts by weight, in particular at least 50 parts by weight, of the hydrophilic water-miscible dispersion medium (B) are preferably miscible with 100 parts by weight of water. As hydrophilic water-miscible dispersion medium (B), preference is given to polar substances, for example aliphatic monohydric alcohols such as methanol, ethanol, n-propanol and i-propanol, glycols, ethers such as dioxane and tetrahydrofuran, dimethylformamide and, in particular, water.

Dispersants (C) which are suitable are a multiplicity of active compounds which are expediently classified into surface-active dispersants, such as nonionic, anionic, cationic and ampholytic dispersants, into partially surface-active dispersants, such as high-molecular-weight substances and natural products, and into dispersants generally having low surface activity, such as inorganic and special dispersion aids. An overview is cited in Ullmanns Encyklopadie der technischen Chemie [Ullmanns Encyclopedia of Industrial Chemistry], Verlag Chemie Weinheim, 4th Edition 1975, Volume 10, pp. 449–473.

Preferably, the dispersant (C) is selected from the following dispersion aids below:
1. Alkyl sulfates, for example having a chain length of 8–18 C atoms, alkyl ether sulfates having 8–18 C atoms in the hydrophobic radical and 1–40 ethylene oxide (EO) or propylene oxide (PO) units.
2. Sulfonates, e.g. alkyl sulfonates having 8–18 C atoms, alkylaryl sulfonates having 8–18 C atoms, esters and half esters of sulfosuccinic acid with monohydric alcohols or alkylphenols having 4–15 C atoms; if appropriate these alcohols or alkylphenols can also be ethoxylated with 1–40 EO units.
3. Alkali metal salts and ammonium salts of carboxylic acids and poly(alkylene glycol) ether carboxylic acids having 8–20 C atoms in the alkyl, aryl, alkaryl or aralkyl radical and 1–40 EO or PO units.
4. Partial phosphoric esters and their alkali metal salts and ammonium salts, e.g. alkyl and alkaryl phosphates having 8–20 C atoms in the organic radical, alkylether phosphates or alkarylether phosphates having 8–20 C atoms in the alkyl or alkaryl radical and 1–40 EO units.
5. Alkyl polyglycol ethers, preferably those having 2–40 EO units and alkyl radicals of 4–20 C atoms.
6. Alkylaryl polyglycol ethers having 2–40 EO units and 8–20 C atoms in the alkyl and aryl radicals.
7. Ethylene oxide/propylene oxide (EO/PO) block copolymers having 8–40 EO or PO units.
8. Fatty acid polyglycol esters having 6–24 C atoms and 2–40 EO units.
9. Fatty esters of glycerol, sorbitol and pentaerythritol.
10. Alkylpolyglycosides of the general formula R"—O—$Z_o$, where R" denotes a linear or branched, saturated or unsaturated alkyl radical having on average 8–24 C atoms and $Z_o$ denotes an oligoglycoside radical having on average o=1–10 hexose or pentose units or mixtures thereof.
11. Polar-group-containing linear organopolysiloxanes having alkoxy groups and up to 24 C atoms and/or up to 40 EO and/or PO groups.
12. Salts of primary, secondary and tertiary fatty amines having 8–24 C atoms with acetic acid, sulfuric acid, hydrochloric acid and phosphoric acids.
13. Quaternary alkyl- and alkylbenzylammonium salts, whose alkyl groups have 1–24 C atoms, in particular the halides, sulfates, phosphates, acetates and hydroxides.
14. Alkylpyridinium, alkylimidazolinium and alkyloxazolinium salts whose alkyl chain has up to 18 C atoms, especially in the form of their halides, sulfates, phosphates and acetates.
15. High-molecular-weight substances such as polymers, e.g. poly(vinyl alcohol) and mixed polymers, such as vinylacetate/ethylene polymers.
16. Natural substances and their conversion products, such as polysaccharides or cellulose and cellulose derivatives, such as cellulose ethers.

A dispersant, or else mixtures of a plurality of dispersants, can be used.

Dispersants which are particularly preferred are the dispersants listed above under 1, 2, 3, 5, 6, 7 and 8, 12, 13, 15, 16, in particular the dispersants listed under 2, 3, 5, 6 and 13.

Preferably, 2.5 to 250, preferably 5 to 150, in particular 10 to 70, parts by weight of dispersant (B) are used per 100 parts by weight of organosilicon compounds (A).

As additives $(D)_1$ the dispersion can contain, for example, fillers, fungicides, bactericides, algicides, biocides, odorants, corrosion inhibitors, native oils, thickeners, wetting agents, cosurfactants and organic solvents.

The dispersions may contain small amounts of organic solvents resulting from the preparation. In particular in the case of the preparation of organopolysiloxane resins, organic solvents or native oils are frequently used. If the dispersion contains organic solvents, their content is preferably at most 50 parts by weight, in particular 5 to 20 parts by weight, based on 100 parts by weight of organosilicon compounds (A).

The content of filler is preferably up to 20 parts by weight, in particular 2 to 8 parts by weight per 100 parts by weight of organosilicon compounds (A).

The preparation of the dispersions is known to those skilled in the art.

For the ready-to-use dispersion, the sum of the components organosilicon compounds (A), dispersion medium (B), dispersants (C) and, if appropriate, additives (D) is preferably 0.01 to 25% by weight, particularly preferably 0.05 to 10% by weight, in particular 0.1 to 2% by weight, based on the weight of the dispersion used.

The mean particle size of the dispersion is preferably at most 1000 mm, in particular 5 nm to 250 mm.

The compositions, particle sizes and concentrations of the dispersions can be matched to the types of rock and conditions, such as temperature and salt content, prevailing in the gas fields, so that the dispersions are injectable even under extreme conditions. The particle size is preferably selected in such a manner that the pore size of the rock is not reached. By means of the high content of the components organosilicon compounds (A), dispersion medium (B), dispersant (C) and, if appropriate, additives (D) in the dispersion, the dispersion medium introduced into the rock can be kept small. The concentration of the dispersion can be matched to rock properties, such as permeability and depth of penetration. In the case of high permeabilities, smaller amounts of more coarsely disperse dispersions having higher contents of the components organosilicon compounds (A), dispersion medium (B), dispersant (C) and, if appropriate, additives (D) can be used. In the case of low rock permeabilities, greater amounts of finely disperse dispersions having lower concentrations are used.

Substances are also suitable which do not form a organosilicon compound (A) in a dispersion medium (B) in which they were previously soluble until service conditions are achieved. Examples of these which may be mentioned are glycol-functional silicone oils, which are soluble in polar dispersion media such as water, but then, at elevated temperatures, reach a cloud point.

In the examples below, unless stated otherwise,
a) all amounts are based on weight;
b) all pressures are 0.1013 MPa (absolute);
c) all temperatures are 20° C.
d) S.T.P.=(volume at) standard conditions (0° C., 0.1013 MPa) (absolute);
e) PV=pore volumes;
f) nitrogen was used as the gas.

EXAMPLES

The examples were carried out in the following manner in the time sequence specified:

A Hassler cell was charged with cores from dry Bentheimer sandstone of dimensions length 0.1 m and diameter 0.03 m.

Nitrogen was passed through each core at a constant flow rate of 50 m/d. The differential pressure $\Delta p_g$ between the core entry and core exit was measured.

The gas permeability $k_g$ was calculated using the Darcy equation for compressible fluids (1):

$$k_g = \frac{2 Q_g \mu_g p_o L}{A(p_1^2 - p_2^2)} \quad (1)$$

in which $Q_g$ denotes the gas flow rate, $\mu_g$ denotes the gas viscosity, $p_0$ denotes the atmospheric pressure 0.1013 MPa, L denotes the core length, A denotes the core cross-sectional area, $p_1$ denotes the injection pressure and $p_2$ denotes the core exit pressure. The gas permeabilities $k_g$ are listed below in Table III.

The core was then saturated with water under a reduced pressure of 0.002 MPa in the desiccator, built into a Hassler cell and water was passed through it at a constant flow rate of 5 m/d. The differential pressure $\Delta p_w$ between the core entry and core exit was measured.

The specific water permeabilities $k_w$ were calculated using the Darcy equation for incompressible fluid (2);

$$k_w = \frac{2 Q_w \mu_w L}{A(p_1 - p_2)} \quad (2)$$

in which $Q_w$ denotes the water flow rate, $\mu_w$ denotes the water viscosity, and L, A, $p_1$ and $p_2$ have the meanings above. The specific water permeabilities $k_w$ are listed below in Table III.

20 pore volumes of PV silicone emulsion were injected into the core. The differential pressure $\Delta p_e$ between the core entry and core exit was measured. The resistance factor RF=$\Delta p_e/\Delta p_w$ was calculated as a measure of flow resistance and is given below in Table III.

20 pore volumes of water were injected into the core. The differential pressure $\Delta p_{wr}$ between the core entry and core exit was measured in the presence of the emulsion as remaining phase. The residual resistance factor RRF=$\Delta p_{wr}/\Delta p_w$ was calculated as a measure of the residual flow resistance and is given below in Table III.

The 4 silicone emulsions described in more detail in Table I below were studied in Example 1–4.

In parallel with these studies, the influence of the residual silicone oil emulsions on the gas permeability was studied on the same cores and emulsion systems as in the Examples one and three for the resistance reactor water.

The dry cores characterized in Table IV were saturated with water under a vacuum of 0.002 MPa in the desiccator, fitted into a Hassler cell and water was passed through them at a constant flow rate of 5 m/d. The differential pressure between core entry and core exit was measured and the water permeability was determined in accordance with equation (2) at 100% water saturation. The water was then displaced with gas at a flow rate of 500 m/d until a residual water saturation between 10 and 15% of the pore volume was established. The displaced water phase was collected and the residual water saturation was determined in accordance with equation (3) from the volume balance between the original amount of water and the displaced amount of water:

$$S_{wr} = \frac{V_{wi} - V_{wp}}{V_{wi}}, \quad (3)$$

in which $V_{wi}$ denotes the water volume originally present in the core and $V_{wp}$ denotes the water volume produced.

The differential pressure between core entry and core exit was then determined at a flow rate of 50 m/d for gas and the gas permeability at residual water saturation was calculated in accordance with formula (1).

The core was then flooded with 20 PV of silicone oil emulsion at a flow rate of 5 m/d and the silicone oil emulsion was displaced by gas at a flow rate of 500 m/d until a residual emulsion saturation between 10 and 15% of the pore volume was established. The saturation was determined in the same manner as in the displacement of water by gas in accordance with equation (3).

The gas permeability of the treated core was then determined in the same manner as that measured in the residual water saturation. In Table IV, the gas permeabilities for residual water and residual emulsion saturation are compared. The relative, i.e. dimensionless, gas permeability used here is the ratio of the gas permeability at residual water or residual emulsion saturation to the specific gas permeability of the core. In contrast to the treatment results cited in the literature, the gas permeability did not decrease but increased.

TABLE I

| Dispersion | SC in % | Active compound | Emulsifier system/cosolvent |
|---|---|---|---|
| 1 | 52.00 | 33% of an amino functional silicone oil of the formula x, with the amine number being 0.25, the viscosity 200 mm²/s and R = Me | 5% diethylene glycol monobutyl ether 13% trimethylnonylpolyglycol ether having 6 EO units 1% fatty alcohol polyglycol ether having a saturated alkyl group ($C_{16}$–$C_{18}$) and 25 EO units Benzalkylammonium chloride as preservative |
| 2 | 50.00 | 33% of an amino functional silicone oil of the formula x, with the amine number being 0.15, the viscosity 5000 mm²/s and R = OH | 5% diethylene glycol monobutyl ether 11% isotridecyl polyglycol ether having 5 EO units 1% fatty alcohol polyglycol ether having a saturated alkyl group ($C_{16}$–$C_{18}$) and 25 EO units Benzalkylammonium chloride as preservative |
| 3 | 39.00 | 35% of an end-capped PDMS with a viscosity of 12,500 mm²/s | 4% isotridecyl polyglycol ether having 10 EO units Kathon as preservative |
| 4 | 41.00 | 35% of an end-capped PDMS with a viscosity of 12,500 mm²/s | 3% alkyl ($C_{14}$–$C_{15}$) sulfonate 3% triethanolammonium alkyl ($C_{12}$–$C_{14}$) sulfate Formaldehyde as preservative |

Formula x: $RSiMe_2O[SiMe_2O]_m[SiMeR'O]_nSiMe_2R$, where $R'=(CH_2)_3NH-CH_2-CH_2-NH_2$ The viscosities of the emulsions 1 to 4 having a content of silicone active compound (A) of 10% by weight are listed below in Table II. The viscosities were measured at 25° C. and a shear rate of 11 s$^{-1}$. In the case of the dilutions with distilled water used in the examples to a concentration of silicone active compound (A) of 0.2% by weight, the viscosities are virtually identical to that of the water.

TABLE II

| Silicone emulsion | Viscosity [mPa · s] |
|---|---|
| 1 | 3.27 |
| 2 | 1.42 |
| 3 | 1.26 |
| 4 | 1.62 |

TABLE III

| Example Silicone emulsion | Core material Bentheimer sandstone | | | RF values at injected pore volumes Silicone emulsion | | | | RF values at injected pore volumes Water | | | |
|---|---|---|---|---|---|---|---|---|---|---|---|
| | Porosity | Gas permeability $k_g$ [µm²] | Water permeability $k_w$ [µm²] | 5 | 10 | 15 | 20 | 5 | 10 | 15 | 20 |
| 1 | 0.208 | 1.99 | 1.82 | 0.97 | 0.94 | 0.94 | 0.98 | 1.21 | 2.1 | 2.72 | 3.1 |
| 2 | 0.221 | 2.85 | 2.61 | 1.03 | 1.11 | 1.23 | 1.3 | 1.89 | 2.49 | 3.06 | 3.5 |
| 3 | 0.234 | 3.41 | 3.31 | 0.91 | 0.91 | 0.91 | 0.97 | 1.12 | 1.36 | 1.85 | 2.4 |
| 4 | 0.234 | 3.21 | 3.2 | 0.97 | 1 | 1.05 | 1.15 | 1.73 | 2.39 | 2.86 | 3.35 |

The RF values before the injection are by definition 1. During the after-flooding phase with water, the RRF values increase continuously. The increase in the RRF values has not ended after the addition of 20 pore volumes of water. The dispersions build up a long-lasting flow resistance for water.

TABLE IV

| Silicone emulsion system | Core material: Porosity | Benth. sands. Specific gas permeability kg ($\mu m^2$) | Residual water saturation $S_{wr}$ % | Relative gas permeability % | Residual emulsion saturation % | Relative gas permeability |
|---|---|---|---|---|---|---|
| 1 | 0.208 | 1.99 | 15 | 0.7 | 15 | 0.74 |
| 2 | 0.234 | 3.41 | 13 | 0.7 | 13 | 0.8 |

What is claimed is:

1. A process for stabilizing the gas flow in natural gas wells and gas storage wells in water-bearing rock which deliver at least 50 l of water per 1000 m³ of natural gas produced, measured at standard temperature and pressure said process comprising injecting a dispersion comprising the following components
   A) an organosilicon compound as a disperse fraction,
   B) a hydrophilic water-miscible dispersion medium, and
   C) optionally a dispersant,
into the water-bearing rock.

2. The process according to claim 1, in which the organosilicon compound (A) is an organopolysiloxane comprising units of the general formulae (I) to (VII)

| | |
|---|---|
| $R_3SiO_{1/2}$ | (I), |
| $R_2SiO$ | (II), |
| $RSiO_{3/2}$ | (III), |
| $SiO_2$ | (IV), |
| $R_2(R'O)SiO_{1/2}$ | (V), |
| $R(R'O)SiO$ | (VI), |
| $R'OSiO_{3/2}$ | (VII), | where
   R denotes monovalent hydrocarbon radicals having 1 to 18 carbon atoms, which are optionally substituted by halogen atoms, cyano, amino, alkylamino, quarternary ammonium, mercapto, epoxy, anhydrido, carboxylato, sulfonato, sulfato, phosphonato, isocyanato or polyoxyalkylene groups,
   R' denotes hydrogen or monovalent hydrocarbon radicals having 1 to 30 carbon atoms optionally substituted by halogen atoms, cyano, amino, alkylamino, quarternary ammonium, mercapto, epoxy, anhydrido, carboxylato, sulfonato, sulfato, phosphonato, isocyanato or polyoxyalkylene groups.

3. The process according to claim 2, in which the hydrophilic water-miscible dispersion medium (B) comprises one or more of aliphatic monoalcohols, glycols, ethers, dimethylformamide, and water.

4. The process according to claim 2, in which 5 to 150 parts by weight of dispersant (C) are used per 100 parts by weight of organosilicon compound (A).

5. The process according to claim 2, in which the dispersion is injected into the water-bearing rock by means of a well, and excess dispersion is distributed in the vicinity of the well by subsequently forcing in gas.

6. The process according to claim 1, in which the hydrophilic water-miscible dispersion medium (B) comprises one or more of aliphatic monoalcohols, glycols, ethers, dimethylformamide, and water.

7. The process according to claim 6, in which 5 to 150 parts by weight of dispersant (C) are used per 100 parts by weight of organosilicon compound (A).

8. The process according to claim 1, in which 5 to 150 parts by weight of dispersant (C) are used per 100 parts by weight of organosilicon compound (A).

9. The process according to claim 8, in which 10–70 parts by weight of dispersant (C) are used per 100 parts by weight of organosilicon compound (A).

10. The process according to claim 1, in which the dispersion is injected into the water-bearing rock by means of a well, and excess dispersion is distributed in the vicinity of the well by subsequently forcing in gas.

11. A process for stabilizing the gas flow in gas wells and gas storage wells in water-bearing rock which deliver at least 50 l of water per 1000 m³ of natural gas produced, measured at standard temperature and pressure, said process comprising injecting a dispersion comprising the components
   A) an organosilicon compound as a disperse fraction,
   B) a hydrophilic water-miscible dispersion medium, and
   C) optionally, a dispersant,
into the water-bearing rock, wherein said organosilicon compound (A) is an organosilane which contains radicals R and OR' where
   R denotes monovalent hydrocarbon radicals having 1 to 18 carbon atoms, which are optionally substituted by halogen atoms, cyano, amino, alkylamino, quarternary ammonium, mercapto, epoxy, anhydrido, carboxylato, sulfonato, sulfato, phosphonato, isocyanato or polyoxyalkylene groups,
   R' denotes hydrogen or monovalent hydrocarbon radicals having 1 to 30 carbon atoms optionally substituted by halogen atoms, cyano, amino, alkylamino, quarternary ammonium, mercapto, epoxy, anhydrido, carboxylato, sulfonato, sulfato, phosphonato, isocyanato or polyoxyalkylene groups.

12. The process according to claim 11, in which the hydrophilic water-miscible dispersion medium (B) comprises one or more of aliphatic monoalcohols, glycols, ethers, dimethylformamide and water.

13. The process according to claim 11, in which dispersants (C) comprise sulfonates, alkali metal salts of carboxylic acids, ammonium salts of carboxylic acids, alkyl polyglycol ethers, alkylaryl polyglycol ethers, quarternary alkyl- and alkylbenzylammonium salts, and mixtures thereof.

14. The process according to claim 11, in which 5 to 150 parts by weight of dispersant (C) are used per 100 parts by weight of organosilicon compound (A).

15. The process according to claim 11, in which the dispersion is injected into the water-bearing rock by means of a well, and excess dispersion is distributed in the vicinity of the well by subsequently forcing in gas.

16. A process for stabilizing the seas flow in gas wells and gas storage wells in water-bearing rock which deliver at least 50 l of water per 1000 m³ of natural gas produced, measured at standard temperature and pressure, said process comprising injecting a dispersion comprising the components
   A) an organosilicon compound as a disperse fraction,
   B) a hydrophilic water-miscible dispersion medium, and
   C) optionally, a dispersant,
into the water-bearing rock, wherein said dispersants (C) comprise sulfonates, alkali metal salts of carboxylic acids, ammonium salts of carboxylic acids, alkyl polyglycol ethers, alkylaryl polyglycol ethers, quarternary alkyl- and alkylbenzylammonium salts, and mixtures thereof.

17. The process according to claim 16, in which 5 to 150 parts by weight of dispersant (C) are used per 100 parts by weight of organosilicon compound (A).

18. A process for stabilizing the gas flow in gas wells and gas storage wells in water-bearing rock which deliver at least 50 l of water per 1000 m³ of natural gas produced, measured at standard temperature and pressure, said process comprising injecting a dispersion comprising the components A) an organosilicon compound as a disperse fraction, B) a hydrophilic water-miscible dispersion medium, and C) optionally, a dispersant, into the water-bearing rock, wherein said organosilicon compound (A) is an organopolysiloxane comprising units of the general formulae (I) to (VII)

| | |
|---|---|
| $R_3SiO_{1/2}$ | (I), |
| $R_2SiO$ | (II), |
| $RSiO_{3/2}$ | (III), |
| $SiO_{4/2}$ | (IV), |
| $R_2(R'O)SiO_{1/2}$ | (V), |
| $R(R'O)SiO$ | (VI), |
| $R'OSiO_{3/2}$ | (VII), | where

R denotes monovalent hydrocarbon radicals having 1 to 18 carbon atoms, which are optionally substituted by halogen atoms, cyano, amino, alkylamino, quarternary ammonium, mercapto, epoxy, anhydrido, carboxylato, sulfonato, sulfato, phosphonato, isocyanato or polyoxyalkylene groups.

R' denotes hydrogen or monovalent hydrocarbon radicals having 1 to 30 carbon atoms optionally substituted by halogen atoms, cyano, amino, alkylamino, quarternary ammonium, mercapto, epoxy, anhydrido, carboxylato, sulfonato, sulfato, phosphonato, isocyanato or polyoxyalkylene groups, further comprising an organosilane which contains radicals R and OR', where R denotes monovalent hydrocarbon radicals having 1 to 18 carbon atoms, which are optionally substituted by halogen atoms, cyano, amino, alkylamino, quarternary ammonium, mercapto, epoxy, anhydrido, carboxylato, sulfonato, sulfato, phosphonato, isocyanato or polyoxyalkylene groups, R' denotes hydrogen or monovalent hydrocarbon radicals having 1 to 30 carbon atoms optionally substituted by halogen atoms, cyano, amino, alkylamino, quarternary ammonium, mercapto, epoxy, anhydrido, carboxylato, sulfonato, sulfato, phosphonato, isocyanato or polyoxyalkylene groups.

19. A process for stabilizing the gas flow in gas wells and gas storage wells in water-bearing rock which deliver at least 50 l of water per 1000 m³ of natural gas produced, measured at standard temperature and pressure, said process comprising injecting a dispersion comprising the components A) an organosilicon compound as a disperse fraction, B) a hydrophilic water-miscible dispersion medium, and C) optionally, a dispersant, into the water-bearing rock, wherein said organosilicon compound (A) is an organopolysiloxane comprising units of the general formulae (I) to (VII)

| | |
|---|---|
| $R_3SiO_{1/2}$ | (I), |
| $R_2SiO$ | (II), |
| $RSiO_{3/2}$ | (III), |
| $SiO_{4/2}$ | (IV), |
| $R_2(R'O)SiO_{1/2}$ | (V), |
| $R(R'O)SiO$ | (VI), |
| $R'OSiO_{3/2}$ | (VII), | where

R denotes monovalent hydrocarbon radicals having 1 to 18 carbon atoms, which are optionally substituted by halogen atoms, cyano, amino, alkylamino, quarternary ammonium, mercapto, epoxy, anhydrido, carboxylato, sulfonato, sulfato, phosphonato, isocyanato or polyoxyalkylene groups, R' denotes hydrogen or monovalent hydrocarbon radicals having 1 to 30 carbon atoms optionally substituted by halogen atoms, cyano, amino, alkylamino, quarternary ammonium, mercapto, epoxy anhydrido, carboxylato, sulfonato, sulfato, phosphonato, isocyanato or polyoxyalkylene groups, wherein said dispersants (C) comprise sulfonates, alkali metal salts of carboxylic acids, ammonium salts of carboxylic acids, alkyl polyglycol ethers, alkylaryl polyglycol ethers, quarternary alkyl- and alkylbenzylammonium salts, and mixtures thereof.

20. A process for stabilizing the gas flow in gas wells and gas storage wells in water-bearing rock which deliver at least 50 l of water per 1000 m³ of natural gas produced measured at standard temperature and pressure, said process comprising injecting a dispersion comprising the components A) an organosilicon compound as a disperse fraction B) a hydrophilic water-miscible dispersion medium, and C) optionally, a dispersant, into the water-bearing rock, wherein said hydrophilic water-miscible dispersion medium (B) comprises one or more of aliphatic monoalcohols, lycols ethers, dimethylformamide and water wherein said dispersants (C) comprise sulfonates, alkali metal salts of carboxylic acids, ammonium salts of carboxylic acids, alkyl polyglycol ethers, alkylaryl polyglycol ethers, quarternary alkyl- and alkylbenzylammonium salts, and mixtures thereof.

* * * * *

UNITED STATES PATENT AND TRADEMARK OFFICE
CERTIFICATE OF CORRECTION

PATENT NO. : 6,206,102 B1
DATED : March 27, 2001
INVENTOR(S) : Gunter Pusch et al.

It is certified that error appears in the above-identified patent and that said Letters Patent is hereby corrected as shown below:

<u>Column 12, claim 16,</u>
Line 58, delete "seas" and insert -- gas --.

<u>Column 14, claim 20,</u>
Line 49, delete "lycols" and insert -- glycols --.

Signed and Sealed this

Fifteenth Day of January, 2002

Attest:

JAMES E. ROGAN
*Director of the United States Patent and Trademark Office*

*Attesting Officer*